March 13, 1951     W. B. WINSTON     2,544,908
MEASURING TAPE DISPENSER AND ANCHOR
Filed April 12, 1948
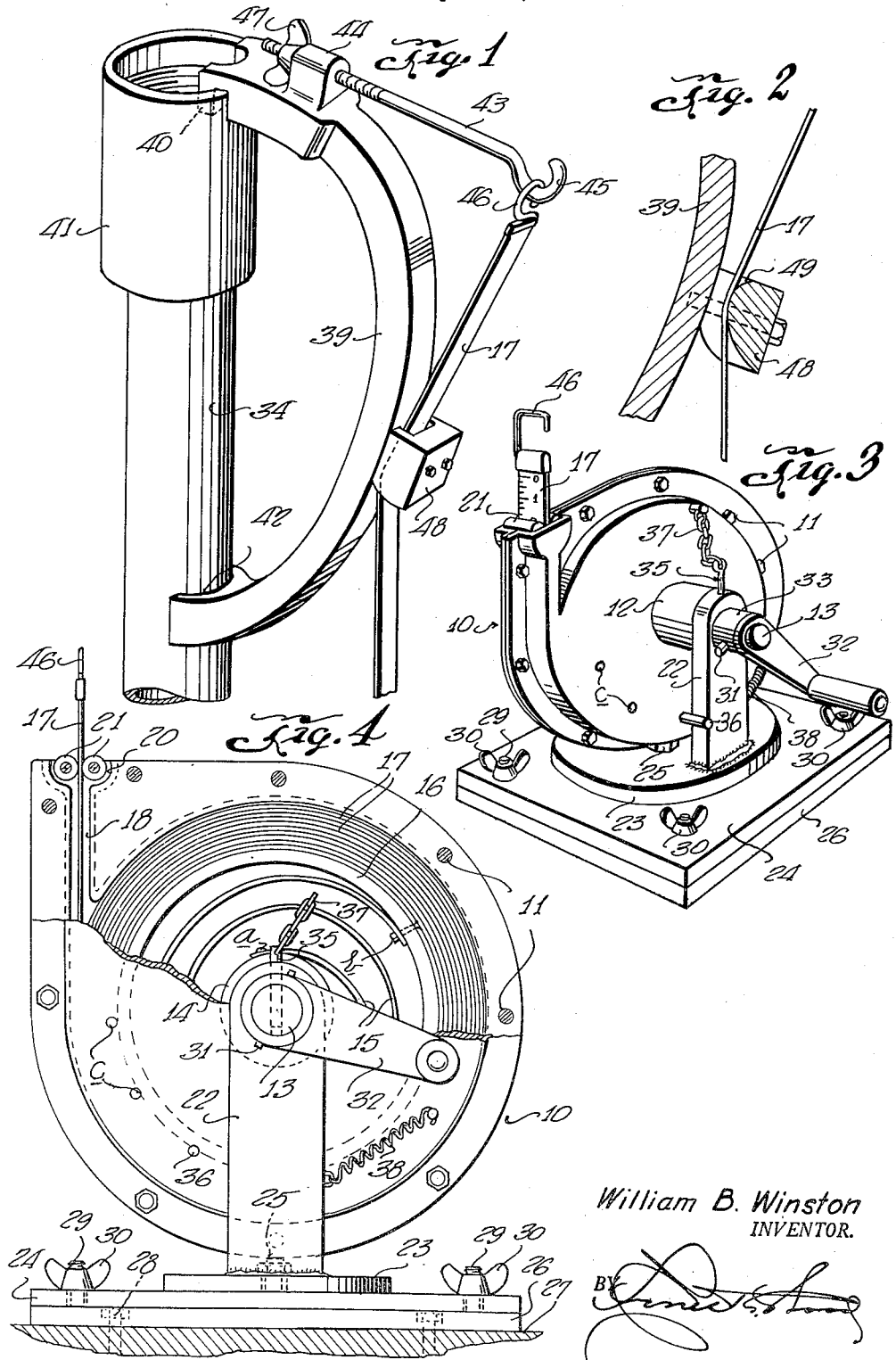
William B. Winston
INVENTOR.
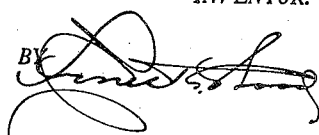
ATTORNEY Patented Mar. 13, 1951

2,544,908

UNITED STATES PATENT OFFICE 2,544,908

MEASURING TAPE DISPENSER AND ANCHOR

William B. Winston, Odessa, Tex.

Application April 12, 1948, Serial No. 20,517

4 Claims. (Cl. 33—138)

This invention relates to measuring apparatus and more particularly to a measuring tape dispenser and anchor adapted chiefly for measuring well pipe and tubing in a derrick.

The principal object of the invention is to provide a medium by which well pipe and tubing and especially drill pipe is measured as it is pulled from or run into the well, the arrangement being such that the operators are relieved of much of the detail this operation involves and to allow their hands to be free to perform other duties.

Another object of the invention is to provide a drill pipe measuring apparatus comprising a housing adapted to rotate or oscillate on a vertical axis and situated on the derrick floor adjacent the rotary table and which contains a reel on which is wound a steel tape under spring tension. The invention also includes an anchor suspended in the derrick and equipped with means to effect its connection to the upper end of the length of pipe to be measured, usually three joints or sections. Moreover, the invention anticipates a provision on the tape anchor to compensate for any protuberances over which the tape is required to pass which would result in inaccurate measurements.

With the foregoing objects in view, the invention has further reference to certain features of accomplishment which will become apparent as the description proceeds, taken in connection with the accompanying drawing wherein:

Figure 1 is a perspective view of the tape anchor attached to the upper end of a length of drill pipe, the latter being shown fragmentarily.

Figure 2 is a fragmentary detail view of the anchor in section showing a tape retaining block affixed to the anchor.

Figure 3 is a perspective view of the tape housing, and

Figure 4 is a side elevational view of the tape housing with a portion broken away to reveal the tape wound therein and the tensioning spring.

Continuing with a more detailed description of the drawing, reference is primarily made to Figures 3 and 4 wherein numeral 10 denotes a circular housing in separable sections, joined together by bolts 11. Each section of the housing has formed thereon a bearing sleeve 12 to receive a shaft 13, the latter extending through the housing or case 10. An annular boss 14 is formed on the shaft 13 midway of its ends and lies wholly within the case. To this boss is affixed, at a, the inner end of a coil spring 15, whose outer end is secured at b to the inner periphery of a reel or spool 16.

Wound upon the spool 16 is a calibrated measuring tape 17 whose inner end is secured to the outer periphery of the spool 16 by the bolt b which connects the spring 15 thereto. The opposite end of the tape 17 extends through a passage 18 in the top of the case 10, formed by confronting channels in the complementary sections of the case. The upper end of the passage 18 is expanded at 20 to receive a pair of cooperating rollers 21, between which the tape 17 passes into and out of the case and which serve to guide and wipe the tape.

The shaft 13 is journaled at each end in a bearing in the upper end of a standard 22. The standards are affixed in upright position on a plate 23 which latter, in turn, is rotatably mounted on a base plate 24 and held in such relationship by a centrally disposed swivel bolt 25. A sub-base 26 is secured to the derrick floor 27 by countersunk bolts 28 and the base plate 24 is attached to the sub-base by means of bolts 29 and wing nuts 30.

One end of the shaft 13 extends beyond the standard 22 and carries a transverse pin 31. A crank 32 has a sleeve 33 slidable on the shaft and slotted to receive the pin 31 so that the shaft 13 may be rotated to impose tension on the spring 15, the slot in sleeve 33 permitting the crank to be readily removed from the shaft. The slot in the sleeve is not shown in the drawing but is conventional in various types of cranks.

It is apparent from the foregoing that when the coil spring 15 is brought under tension by operating the crank 32, it exerts a force tending to return the extended portion of the tape 17 to the spool 16, thus maintaining tension on the tape when the end thereof is connected to a length of drill pipe 34 (Fig. 1) in a manner to be presently explained. When the tape is thus brought under tension, a pin 35 is inserted through a hole in the top of one of the standards 22 into a hole in the shaft 13 in register therewith to secure the shaft against rotation. A stop pin 36 is arranged to be selectively inserted in spaced apart holes $a$ in the side of the case and adapted to come up against the standard 22 to prohibit a tendency of the case to revolve on the shaft 13 while the crank 32 is being turned to wind the spring 15. Also, when the pin 36 is placed in other holes $c$, the angle of emergency of the tape from the case is changed. A chain 37 connects the pin 35 with the case 10 to prevent misplacement or loss of the pin.

As a means to hold the case 10 against a tendency to revolve on the shaft 13 under tension of the spring 15, and yet yield to the tension on the tape 17, a coil spring 38 is connected at one end to the case and at its opposite end to a standard 22.

Referring now to the tape anchor shown in Figures 1 and 2, an arcuated member 39 constitutes the body of the anchor and at one end thereof is formed a lip 40 which is received by an end of the tool joint 41. The opposite end of the member 39 has an arcuate recess 42 corresponding to the curvature of the pipe 34 against which the lower end of the anchor bears.

The purpose in curving the body of the anchor outwardly from the pipe is to provide clearance for the elevator (not shown) and to compensate for the divergence necessitated by the elevator and yet insure accurate measurement of the pipe, a rod 43 is retained for free sliding movement in a boss 44 formed on the anchor 39 at its upper end and is provided with a hook 45 on its outer end to which is attached a hook 46 on the end of the tape 17. A wing nut 47 threaded on the end of the rod 43 provides adjustment in the length of the rod and a consequent adjustment in the degree of divergence of the tape between a retaining block 48, secured to the anchor 39 and the upper end of the tape. The degree of divergence of the tape at its upper extremity becomes a known factor which can be accurately considered in calculating the total length of the pipe below the joint 41, irrespective of the variance caused by an obstruction, such as an elevator attached to the joint 41, which prevents parallelism of the tape and pipe from top to bottom.

The guide block 48 holds the tape below the anchor 39 in parallelism with the pipe and its tape bearing face 49 is curved to avoid imposing a strain on the tape likely to sever the same.

In operation, the tape case 10 is secured to the derrick floor within easy reach from the rotary table and the hook 46 of the tape is connected to the hook 45 on the rod 43 of the anchor, the latter being suspended at some point in the derrick accessible to the derrick-man. The derrickman hooks the lip 40 over the edge of the tool joint of a pipe raised by the elevator. Meanwhile, the floor crew has operated the crank 32 to impose tension on the spring 15 and tape 17 and installed the locking pin 35. Tension is thus held on the tape during the entire run or for as long as desired.

When the pipe is pulled out of the hole the desired length, usually in groups of three joints, one of the floor crew grasps the tape and swings it over to the lower end of the pipe and obtains a reading thereof, usually at the shoulder of the tool joint box and pin, after which he merely releases the tape and the latter responds to the tension of spring 15 and rewinds on the spool 16. The crew then breaks or unscrews the joint and sets it in the rack until again used. This cycle is repeated until all or any part of the pipe is out of the hole.

The fact that the case 10 may revolve on the axis 25, which is perpendicular to the stationary base plate 24, permits the tape 46 to be oriented with more expediency with the pipe being measured, should the latter change positions as it is moved into and out of the well.

When it is desired to return all of the tape 17 to the case 10, the pin 35 is removed to release the shaft, after which the crank is applied to the latter to wind the tape on the spool 16.

It is preferred that the pin 35 be made of comparatively soft material in order that it will shear off and thereby avoid breaking of the tape when subjected to undue strain.

Manifestly, the construction as shown and described is capable of some modification and such modification as may be construed to fall within the scope and meaning of the appended claims is also considered to be within the spirit and intent of the invention.

What is claimed is:

1. Apparatus for measuring well pipe in a derrick, comprising a stationary base, a plate mounted on said base for rotation on an axis perpendicular to said base, and having parallel uprights thereon, a tape storage case, a shaft rotatably supporting said case between said uprights and freely rotatable in said case and having its end journaled in said uprights, a tape reel in said case, a spring having one end affixed to said reel and the other to said shaft for resisting rotation of said tape reel to restore unwound tape on the latter, a tape anchor remote from said case, comprising an arcuated member having a hook on one end adapted to engage the upper end of a pipe to be measured, the lower end of said member resting against said pipe, a longitudinally adjustable rod on said arcuated member, means for attaching the free end of said tape to the outer end of said rod, means for holding said tape slidably in relation to said arcuate member and for spacing the upper ends of said tape and pipe during the operation of measuring the latter and means for securing said shaft against rotation during said measuring operation.

2. Apparatus for measuring well pipe in a derrick during its removal from and replacement in a well, comprising a tape reel and a case therefor, a base adapted to be mounted on the floor of said derrick, means connecting said case to said base for rotation on an axis perpendicular to the latter for orientation with respect to the well pipe, a shaft on said connecting means for rotatably supporting said case, a tape on said tape reel and emerging through a slot in said case, a spring connected at one end to said reel and at its opposite end to said shaft for resisting rotation of said tape reel and for restoring said tape on said reel, an arcuated tape anchor arm adapted to be removably attached to the top of a length of well pipe, a rod adjustable longitudinally on the upper end of said anchor arm, a hook on the outer end of said rod to which is connected the upper end of said tape, a guide block on said arcuate arm for holding said tape in outwardly spaced relation to said pipe below said anchor and means for securing said shaft against rotation during the operation of measuring said pipe.

3. A tape dispenser and anchor for measuring well pipe, including a base, a plate rotatably mounted on said base having uprights, a shaft supported between said uprights, a case rotatably mounted on said shaft which is rotatable freely in said case, a reel on said shaft, a measuring tape wound on said reel and emerging through a slot in said case, means connected to said reel and shaft and interposed therebetween for restoring unwound tape on said reel, an arcuate tape anchor arm remote from said case, a rod mounted on and extending outwardly from said anchor arm and to which said tape is attached at its upper end, said rod being longitudinally adjustable to compensate for protuberances on said pipe prohibiting parallelism of said tape and pipe in measuring the latter, and means for securing said shaft against rotation in said case during measuring operations.

4. In an apparatus for measuring well pipe during removal and replacement thereof in a well, a stationary base, a plate rotatable on an axis perpendicular to said base and having uprights thereon, a shaft rotatably supported by said uprights, a tape dispenser comprising a case rotatable on said shaft, a reel on said shaft, a measuring tape wound on said reel and emerging through a slot in said case, a coil spring connecting said reel to said shaft, a crank for winding said spring to impose tension thereon effective to restore unwound tape to said reel, a tape anchor adapted to be removably attached to the end of a well pipe, said anchor comprising an arcuated arm having on one end a lip engaging the upper end of a section of pipe and whose other end is shaped to conform to and bear against the pipe at a point spaced below the end thereof, means on said arm through which a measuring tape is extended and held spaced away from said pipe, a rod attached to said arm and extending outwardly at right angles to an axis through said ends of the arm, and means on the outer end of said rod adapted to hold said tape at a divergent angle to said pipe to compensate for obstructions on said pipe in measuring the length of the latter.

WILLIAM B. WINSTON.

REFERENCES CITED

The following references are of record in the file of this patent:

UNITED STATES PATENTS

| Number | Name | Date |
|---|---|---|
| 348,805 | Wheeler | Sept. 7, 1886 |
| 1,003,626 | Malcolm | Sept. 19, 1911 |
| 2,028,836 | Holgate | Jan. 28, 1936 |